(12) United States Patent
Liu et al.

(10) Patent No.: US 8,705,464 B2
(45) Date of Patent: Apr. 22, 2014

(54) PACKET SCHEDULING METHOD AND COMMUNICATION APPARATUS USING THE SAME

(75) Inventors: Wen-Jiunn Liu, Hsinchu County (TW); Kai-Ten Feng, Taipei (TW)

(73) Assignee: Universal Scientific Industrial (Shanghai) Co., Ltd., Shanghai (CN)

( * ) Notice: Subject to any disclaimer, the term of this patent is extended or adjusted under 35 U.S.C. 154(b) by 712 days.

(21) Appl. No.: 12/838,498

(22) Filed: Jul. 19, 2010

(65) Prior Publication Data

US 2011/0149888 A1    Jun. 23, 2011

(30) Foreign Application Priority Data

Dec. 22, 2009   (TW) .............................. 98144314 A

(51) Int. Cl.
*H04W 72/12* (2009.01)

(52) U.S. Cl.
USPC ........................................................ 370/329

(58) Field of Classification Search
USPC .................................. 370/252, 328–330, 350
See application file for complete search history.

(56) References Cited

U.S. PATENT DOCUMENTS

| | | | | |
|---|---|---|---|---|
| 5,742,639 A | * | 4/1998 | Fasulo et al. .................. | 375/219 |
| 2006/0146888 A1 | * | 7/2006 | Den Hollander et al. ..... | 370/503 |
| 2009/0274071 A1 | * | 11/2009 | Ramesh et al. ............... | 370/277 |

OTHER PUBLICATIONS

You-Lin Chen et al., Energy-efficient Sleep-mode Operations for Broadband Wireless Access Systems, Vehicular Technology Conference 2006, VTC-2006 Fall., 2006 IEEE 64th, p. 1-5, Sep. 25-28, 2006.
Tuan-Che Chen et al., Maximizing Unavailability Interval for Energy Saving in IEEE 802.16e Wireless MANs, Mobile Computing, IEEE Transactions on Apr. 2009, vol. 8, issue 4, p. 475-487.

* cited by examiner

*Primary Examiner* — Faruk Hamza
*Assistant Examiner* — Jean F Voltaire
(74) *Attorney, Agent, or Firm* — Li & Cai Intellectual Property (USA) Office

(57) ABSTRACT

Exemplary embodiments of the present disclosure provide several packet scheduling methods and communication apparatuses using the same. The packet scheduling method is different from the conventional packet scheduling method, since it does not schedule the sleep interval of the mobile subscriber station based upon the connections as the conventional packet scheduling method. Instead, the packet scheduling method considers the quality of service, and aggregates the data bursts to the frame corresponding to the frame index to which the data bursts are shifted based upon the individual packet, such that a total time length of the sleep intervals of the mobile subscriber station is maximized, and the maximum power saving efficiency is obtained correspondingly.

16 Claims, 13 Drawing Sheets

PACKET SCHEDULING METHOD AND COMMUNICATION APPARATUS USING THE SAME

CROSS-REFERENCE TO RELATED APPLICATION

This application claims the priority benefit of Taiwan application serial no. 98144314, filed on Dec. 22, 2009. The entirety of the above-mentioned patent application is hereby incorporated by reference herein and made a part of this specification.

BACKGROUND

1. Technical Field

The present disclosure generally relates a packet scheduling method using in a broadband wireless network, and more particularly to a frame aggregation-based packet scheduling method being capable of power saving, and to a communication apparatus using the same.

2. Description of Related Art

The mobile subscriber station (abbreviated as "MSS") has the sleep mode specified according to IEEE 802.16e standard. The sleep mode is used to reduce the power consumption of the MSS. Assuming the MSS and the base station (abbreviated as "BS") have establish the connection, if there are no packets received or transmitted by the MSS for a certain time period, the MSS may switch from the normal mode to the sleep mode. The duration of the sleep mode can be divided into several cycles, and each cycle may also comprises both of the sleep and listen intervals. In the listen interval, the MSS can receive or transmit the data, or listen to a medium access control (abbreviated as "MAC") message from the BS. In the listen interval, the MSS may switch to the sleep power state, or the MSS may associate with the other neighbor BSs for handover scanning purpose.

The IEEE 802.16e standard defines three types of the power saving mechanisms in the WiMax system. Referring to FIG. 1, FIG. 1 is schematic diagram showing the three types of the power saving mechanisms in the WiMax system. The detailed introduction of the three types of the power saving mechanisms in the WiMax system is stated in the following description. With respect to the first type of the power saving mechanism, the sleep interval in the sleep mode is exponentially growing. For example, when the first type of the power saving mechanism is used, the time period of the sleep mode contains the sleep intervals 101, 103, 105, and listen intervals 102, 104, 106, wherein the sleep interval 103 is the twice of the sleep interval 101, and sleep interval 105 is the twice of the sleep interval 103. With respect to the second type of the power saving mechanism, the sleep interval in the sleep mode is fixed. For example, when the second type of the power saving mechanism is used, the time period of the sleep mode contains the sleep intervals 111, 113, 115, and listen intervals 112, 114, 116, wherein the total time length of the sleep intervals 111, 113, 115 are identical. With respect to the third type of the power saving mechanism, the sleep mode does not contain any listen interval, but contains a long sleep interval. For example, when the third type of the power saving mechanism is used, the time period of the sleep mode merely contains the sleep interval 121.

The above three different types of the power saving mechanism are designed to the single connection. However, in the general case, the MSS may simultaneously have many connections, and the above power saving mechanisms can not be used to achieve the end of power saving. Assuming there are two connections of different types, and the sleep intervals of the two connections are T, if the time offset between the two sleep intervals is T/2, it results the MSS always operates in the high power consumption state, thus being unable to save power.

Referring to FIG. 2, FIG. 2 is schematic diagram showing the sleep frames and sleep frames in the sleep mode generated by the MSS having a plurality of connections. In FIG. 2, the parameter $T_f$ represents a frame time length, the MSS and the BS have established a plurality of connection links, for example, the connections CID1-CID3. The MSS determines the listen intervals and the sleep intervals between the MSS and the BS according to the listen intervals and the sleep intervals of CID1-CID3.

Regarding the connection CID1, its delay constraint $D_1$ is triple of the frame time length $T_f$, i.e. $D_1=3T_f$. The listen interval of the connection CID1 comprises the frame periods 201, 204, 207, and 210. The sleep interval of the connection CID1 comprises the frame periods 202, 203, 205, 206, 208, and 209. During the frame periods 201, 204, 207, and 210, there are a plurality of data bursts B01-B04 generated for the connection CID1.

Regarding the connection CID2, its delay constraint $D_1$ is triple of the frame time length $T_f$, i.e. $D_2=3T_f$. The listen interval of the connection CID2 comprises the frame periods 203, 206, and 209. The sleep interval of the connection CID2 comprises the frame periods 201, 202, 204, 205, 207, 208, and 210. During the frame periods 203, 206, and 209, there are a plurality of data bursts B11-B13 generated for the connection CID2.

Regarding the connection CID3, its delay constraint $D_3$ is four times of the frame time length $T_f$, i.e. $D_3=4T_f$. The listen interval of the connection CID3 comprises the frame periods 201, 205, and 209. The sleep interval of the connection CID3 comprises the frame periods 202-204, 206-208, and 210. During the frame periods 201, 205, and 209, there are a plurality of data bursts B21-B24 generated for the connection CID3.

In the listen interval of each connection, there is a data burst generated. With respect to the MSS supporting the unsolicited grant service real connection, the data burst generated in each frame period of the connections CID1-CID3 are aggregated into the frame thereof, and the frame period is the listen interval in the sleep mode. If there are no data bursts generated in some frame period of the connections, the frame period is the sleep interval in the sleep mode.

Taking FIG. 2 as an example, the frame period 201 is the listen interval when the MSS operates in the sleep mode, wherein the frame in the frame period 201 comprises the data busts B01, B21 of the connections CID1, and CID3. The frame period 202 is the sleep interval when the MSS operates in the sleep mode, because there are no data bursts for the connections CID1-CID3 in the frame time 202. The frame periods 203-207 are the listen intervals when the MSS operates in the sleep mode, wherein the frame in the frame period 203 comprises the data burst B11 for the connection CID2, the frame in the frame period 204 comprises the data burst B02 for the connection CID1, the frame in the frame period 205 comprises the data burst B22 for the connection CID3, the frame in the frame period 206 comprises the data burst B12 for the connection CID2, and the frame in the frame period 207 comprises the data burst B03 for the connection CID1. The frame period 208 is the sleep interval when the MSS operates in the sleep mode, because there are no data bursts for the connections CID1-CID3 in the frame time 208. The frame periods 209 and 210 are the listen intervals when the MSS operates in the sleep mode, wherein the frame in the frame period 209 comprises the data burst B13 for the connection CID2 and data burst B23 for the connection CID3, and the frame in the frame period 210 comprises the data burst B04 for the connection CID1.

To solve the problem which the power saving algorithm can not be used in the case with multiple connection links, several patent applications and academic papers now have proposed a plurality of packet scheduling methods for dealing this problem. However, the packet scheduling methods consider all of the connection links to schedule.

SUMMARY

Exemplary embodiments of the present disclosure provide several packet scheduling methods and communication apparatuses using the same. The packet scheduling method is not the same as the conventional packet scheduling method, since it does not schedule the sleep interval of the mobile subscriber station based upon the connections as the conventional packet scheduling method. Instead, the packet scheduling method considers the quality of service, and aggregates the data bursts to the frame corresponding to the frame index to which the data bursts are shifted based upon the individual packet, such that a total time length of the sleep intervals of the mobile subscriber station is maximized, and the maximum power saving efficiency is obtained correspondingly.

An embodiment of the present disclosure provides a packet scheduling method. The packet scheduling method used to aggregate unscheduled data bursts of grant spaces in a grant space set into frames, wherein each grant space comprises a start frame index, a termination frame index, and a data frame index. At step 1, a minimum of the termination frame indices of the grant spaces in the grant space set is found as a stuck frame index. At step 2, a stuck group is found according to the start frame indices of the grant spaces in the grant space set and the stuck frame index, and the data bursts of the stuck group are shifted to a frame corresponding to the stuck frame index. At step 3, the data bursts of the grant spaces of the stuck group in the frame corresponding to the stuck frame index are shifted.

An embodiment of the present disclosure provides a communication apparatus. The communication apparatus comprises a memory, a wireless transmitting/receiving unit, and a computing unit, wherein the computing unit is connected to the memory and the wireless transmitting/receiving unit. The memory records program codes of a packet scheduling method, and the packet scheduling method is used to aggregate unscheduled data bursts of grant spaces in a grant space set into frames, wherein each grant space comprises a start frame index, a termination frame index, and a data frame index. The computing unit is used to execute the program codes, so as to control the wireless transmitting/receiving unit to at least execute above step 1-step 3.

An embodiment of the present disclosure provides a packet scheduling method. The packet scheduling method is used to backward adjust data bursts when the number of the data bursts in a frame is larger than a data burst accommodated number of the frame. At step A, a data burst to be shifted currently and a targeted frame index are served as a first and second input variables of a backward adjustment function. At step B, the backward adjustment function is calculated. At step C, if an output of the backward adjustment function is true, the data burst served as the first input variable of the backward adjustment function is shifted to the frame corresponding to the targeted frame index served as the second input variables of the backward adjustment function, and then the packet scheduling method is ended. At step D, if the output of the backward adjustment function is false, one of the data bursts at the targeted frame index with a minimum start frame index is served as the first input variable of the backward adjustment function. Step E is executed after step D is executed, at step E, for the target frame index is equal to the current target frame index minus 1 through the start frame index of the data burst served as first input variable of the backward adjustment function, the target frame index is sequentially served as the second input variable of the backward adjustment function, the backward adjustment function is iteratively calculated, and if the output of the backward adjustment function is true, the data burst served as the first input variable of the backward adjustment function is shifted to the frame corresponding to the targeted frame index served as the second input variable of the backward adjustment function, and then the packet scheduling method is ended.

An embodiment of the present disclosure provides a communication apparatus. The communication apparatus comprises a memory, a wireless transmitting/receiving unit, and a computing unit, wherein the computing unit is connected to the memory and the wireless transmitting/receiving unit. The memory records program codes of a packet scheduling method, and the packet scheduling method is used to backward adjust data bursts when the number of the data bursts in a frame is larger than a data burst accommodated number of the frame. The computing unit is used to execute the program codes, so as to control the wireless transmitting/receiving unit to at least execute above step A-step E.

Based upon the above description, the packet scheduling method provided by exemplary embodiments of the present disclosure can let the MSS having connections aggregate the data bursts of the connections into part of frames, so as to reduce the total time length of the listen intervals of the MSS, and increase the total time length of the sleep intervals of the MSS. Accordingly, the end of power saving is achieved.

It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Referring to FIG. 3.

Referring to FIG. 7.

DESCRIPTION OF EXEMPLARY EMBODIMENTS

Figure 1:
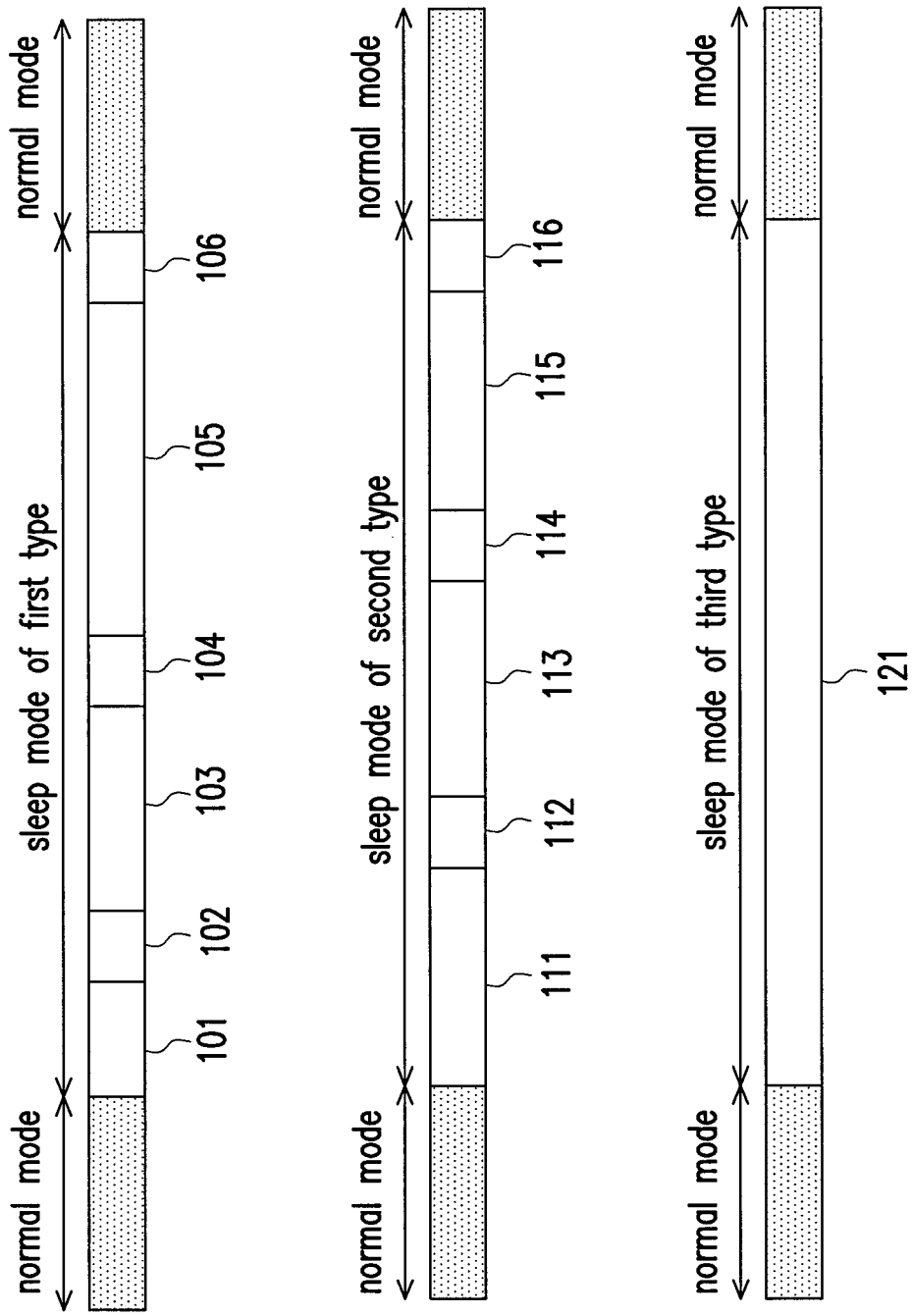
FIG. 1 is schematic diagram showing the three types of the power saving mechanisms in the WiMax system.
Figure 2:
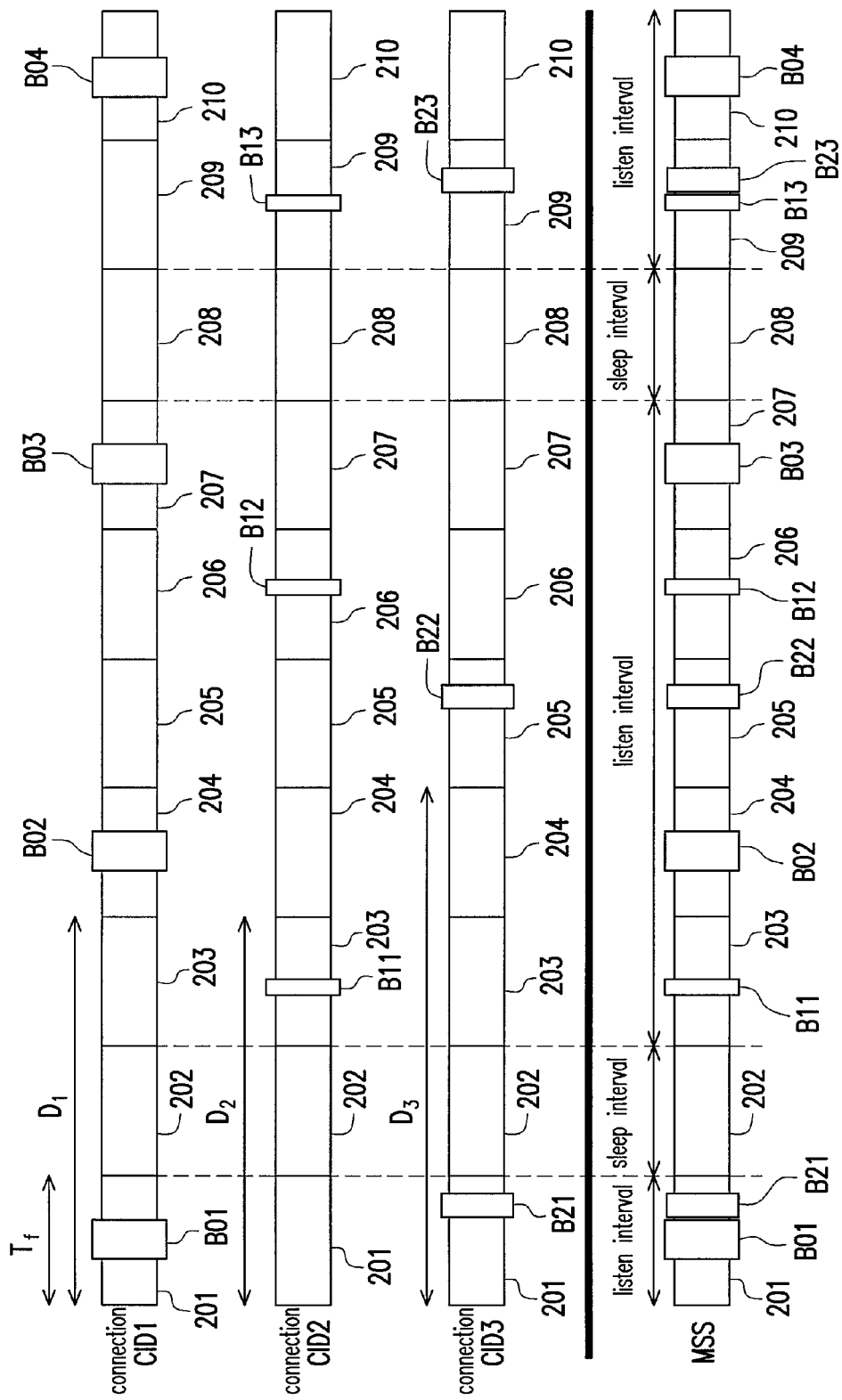
FIG. 2 is schematic diagram showing the sleep frames and sleep frames in the sleep mode generated by the MSS having a plurality of connections.

Exemplary embodiments of the present disclosure provide several packet scheduling methods. The packet scheduling method is different from the conventional packet scheduling method, since it does not schedule the sleep interval of the mobile subscriber station based upon the connections as the conventional packet scheduling method. Instead, the packet scheduling method considers the quality of service, and aggregates the data bursts to the frame corresponding to the frame index to which the data bursts are shifted based upon the individual packet, such that a total time length of the sleep intervals of the mobile subscriber station is maximized, and the maximum power saving efficiency is obtained correspondingly.

Furthermore, exemplary embodiments of the present disclosure provide several communication apparatuses and communication systems, wherein the communication apparatuses and communication systems use at least one of the packet scheduling methods provided by exemplary embodiments of the present disclosure. The communication apparatus is also called MSS, and the communication apparatus may be a cell-phone, a notebook, a personal digital assistant, and so on. The communication system may WiMax system and other communication system, and the communication system has capability of the quality of service, wherein the quality of service may be the unsolicited grant service real connection or the realtime traffic variable-rate connection.

Reference will now be made in detail to the exemplary embodiment of the disclosure, examples of which are illustrated in the accompanying drawings. Wherever possible, the same reference numbers are used in the drawings and the description to refer to the same or like parts. Furthermore, the exemplary embodiments are used to illustrate the present disclosure without limiting the scope of the present disclosure.

To illustrate the present disclosure concretely, some variables and terms are firstly illustrated specified in the exemplary embodiments are illustrated herein before the packet scheduling methods provided by the exemplary embodiments of the present disclosure are illustrated.

In the present disclosure, each data burst for each of connections in a data packet can be presented by using a grant space. When the frame corresponding to the frame index $s_i$ has one unscheduled data burst, it can define the frames corresponding to the frame indices $s_i$ through $t_i$ as the $i^{th}$ grant space $G_i(s_i,g_i,t_i)$, wherein $s_i$ presents the start frame index of the $i^{th}$ grant space $G_i(s_i,g_i,t_i)$, $g_i$ presents the possible frame index of the $i^{th}$ grant space $G_i(s_i,g_i,t_i)$ for accommodating the data burst, $g_i$ herein is called the data frame index, and $g_i$ presents the termination frame index of the $i^{th}$ grant space $G_i(s_i,g_i,t_i)$. The $i^{th}$ grant space $G_i(s_i,g_i,t_i)$ has a specific delay constraint $D_i$. The termination frame index $t_i$ is equal the start frame index $s_i$ plus the delay constraint $D_i$ minus 1, i.e. $t_i=s_i+D_i-1$, and the data frame index $g_i$ is in the range between the start frame index $s_i$ and the termination frame index $t_i$, i.e. $s_i \leq g_i \leq t_i$.

Figure 3:
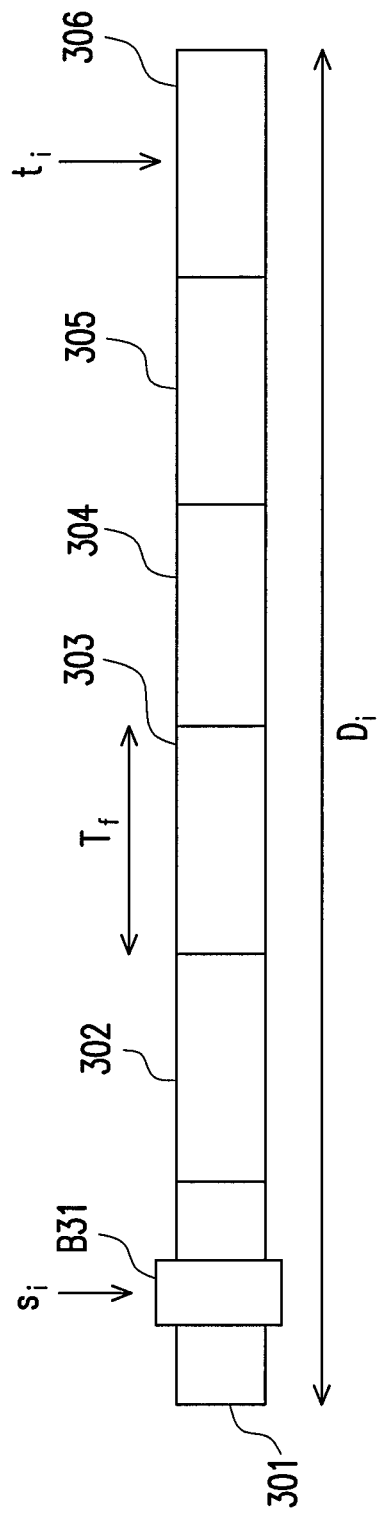
FIG. 3 is a schematic diagram showing the $i^{th}$ grant space $G_i(s_i, g_i, t_i)$ according to one exemplary embodiment of the present disclosure.

Referring to FIG. 3, FIG. 3 is a schematic diagram showing the $i^{th}$ grant space $G_i(s_i,g_i,t_i)$ according to one exemplary embodiment of the present disclosure. According to the above definition, the frame corresponding to frame index $s_i$ in FIG. 3 has an unscheduled data burst B31, and the frame corresponding to termination frame index $t_i$ is the frame 306. After the data burst B31 is scheduled, the frame corresponding to the data frame index $g_i$ is one of the frames 301-306. In FIG. 3, the delay constraint is six times of frame time lengths, i.e. $D_i=6T_f$.

Figure 4:
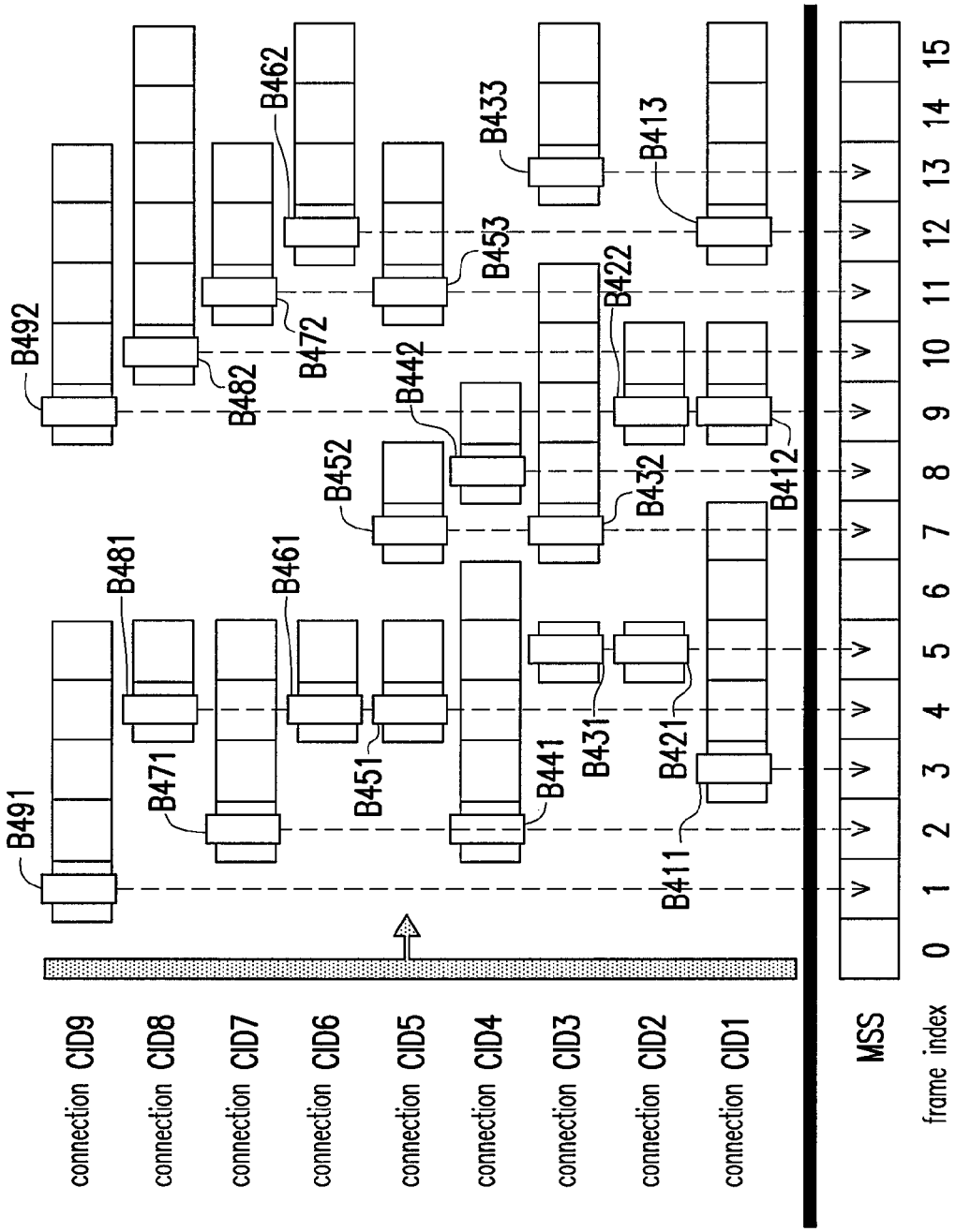
FIG. 4 is a schematic diagram showing unscheduled data bursts for multiple connections of the MSS according to an exemplary embodiment of the present disclosure.

By using the definition of the grant space, transmission on multiple connections of the MSS can be modeled by multiple grant spaces. Referring to FIG. 4, FIG. 4 is a schematic diagram showing unscheduled data bursts for multiple connections of the MSS according to an exemplary embodiment of the present disclosure. In FIG. 4, the MSS has nine connections CID1-CID9 current used, and each data burst for each connection and its delay constraint can be modeled as a grant space. For example, the first data burst B411 for the connection CID1 has a delay constraint $D_{411}$ of five frame time lengths, i.e. $D_{411}=5T_f$, and thus a grant space $G_{411}(s_{411}, g_{411}, t_{411})$ can be modeled for representing the data burst B411, wherein $s_{411}=3$, $t_{411}=7$, and $3 \leq g_{411} \leq 7$. For example, the first data burst B491 for the connection CID9 has a delay constraint $D_{491}$ of five frame time lengths, i.e. $D_{491}=5T_f$, and thus a grant space $G_{411}(s_{491}, g_{491}, t_{491})$ can be modeled for representing the data burst B491, wherein $s_{491}=1$, $t_{491}=5$, and $1 \leq g_{491} \leq 5$. Though the above description merely illustrates the examples of the two data bursts B411 and B491, the other data bursts and delay constraints thereof can be modeled as several grant spaces in the similar manner.

The packet scheduling method provided by one exemplary embodiment of the present disclosure can comprise two main steps of the frame aggregation procedure and the backward adjustment procedure. However, in the other exemplary embodiment of the present disclosure, the packet scheduling method may just one of the two main steps of the frame aggregation procedure and the backward adjustment procedure.

Still referring to FIG. 4, assuming each frame of the MSS in FIG. 4 can accommodate $F_{max}$ data bursts, i.e. $F_{max}$ is a data burst accommodated number of the frame, each data burst can be scheduled, such that the data bursts for different connections can be aggregated into one frame of the MSS densely, and a total time length or a total number of sleep intervals of the MSS can be increased. Therefore, the power saving object is achieved, and the battery life is prolonged. For example, if the frame can accommodate three data bursts, i.e. $F_{max}$=3, the data burst B432 for the connection CID3 and the data burst B452 for the connection CID5 may be shifted to the frame corresponding the frame index of 8, and thus the data bursts B442 for the connection CID4, the data burst B432 for the connection CID3, and the data burst B452 for the connection CID5 can be aggregated into one frame. Thus the MSS can sleep in the frame period corresponding to the frame index of 7. In short, as long as the data burst can be delayed, i.e. the delay constraint must be larger than the frame time length $T_f$, the data burst can be shifted for scheduling, such that the power saving object is achieved, and the battery life is prolonged.

Figure 5:
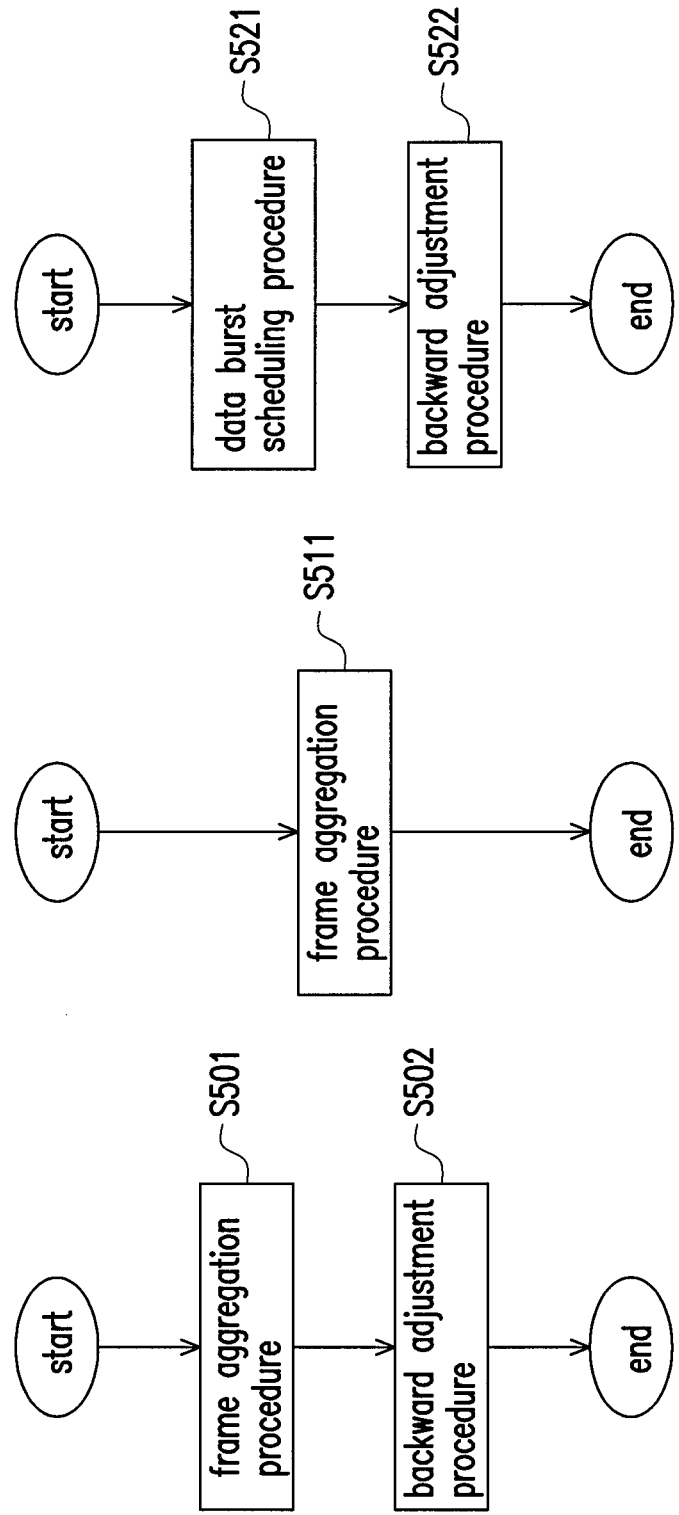
FIG. 5A is a flow chart of a packet scheduling method provided by an exemplary embodiment of the present disclosure.
FIG. 5B is a flow chart of a packet scheduling method provided by another exemplary embodiment of the present disclosure.
FIG. 5C is a flow chart of a packet scheduling method provided by another exemplary embodiment of the present disclosure.

Referring to FIG. 5A, FIG. 5A is a flow chart of a packet scheduling method provided by an exemplary embodiment of the present disclosure. In FIG. 5A, when the packet scheduling method is execute to schedule the data bursts, the frame aggregation procedure at step S501 and the backward adjustment procedure at step S502 are sequentially executed.

Referring to FIG. 5B, FIG. 5B is a flow chart of a packet scheduling method provided by another exemplary embodiment of the present disclosure. In FIG. 5B, when the packet scheduling method is execute to schedule the data bursts, merely the frame aggregation procedure at step S511, and the backward adjustment procedure at step S502 shown in FIG. 5A is omitted. In the exemplary embodiment of FIG. 5B, after the frame aggregation procedure at step S511 is executed, if the number of the data bursts aggregated into some frame is larger than the data burst accommodated number of the frame at step S511, a backward adjustment procedure different from that at step S502 may be executed, such that the data bursts which the frame is unable to contain are shifted to the other frames.

Referring to FIG. 5C, FIG. 5C is a flow chart of a packet scheduling method provided by another exemplary embodiment of the present disclosure. In the exemplary embodiment of FIG. 5C, when the packet scheduling method is execute to schedule the data bursts, at step S51, the data bursts is firstly scheduled, and after the data bursts are scheduled. If the number of the data bursts aggregated into some frame is larger than the data burst accommodated number of the frame at step S521, a backward adjustment procedure at step S522 is executed, wherein the scheduling manner at step S521 is different from that of the frame aggregation procedure at step S501.

Figure 9:
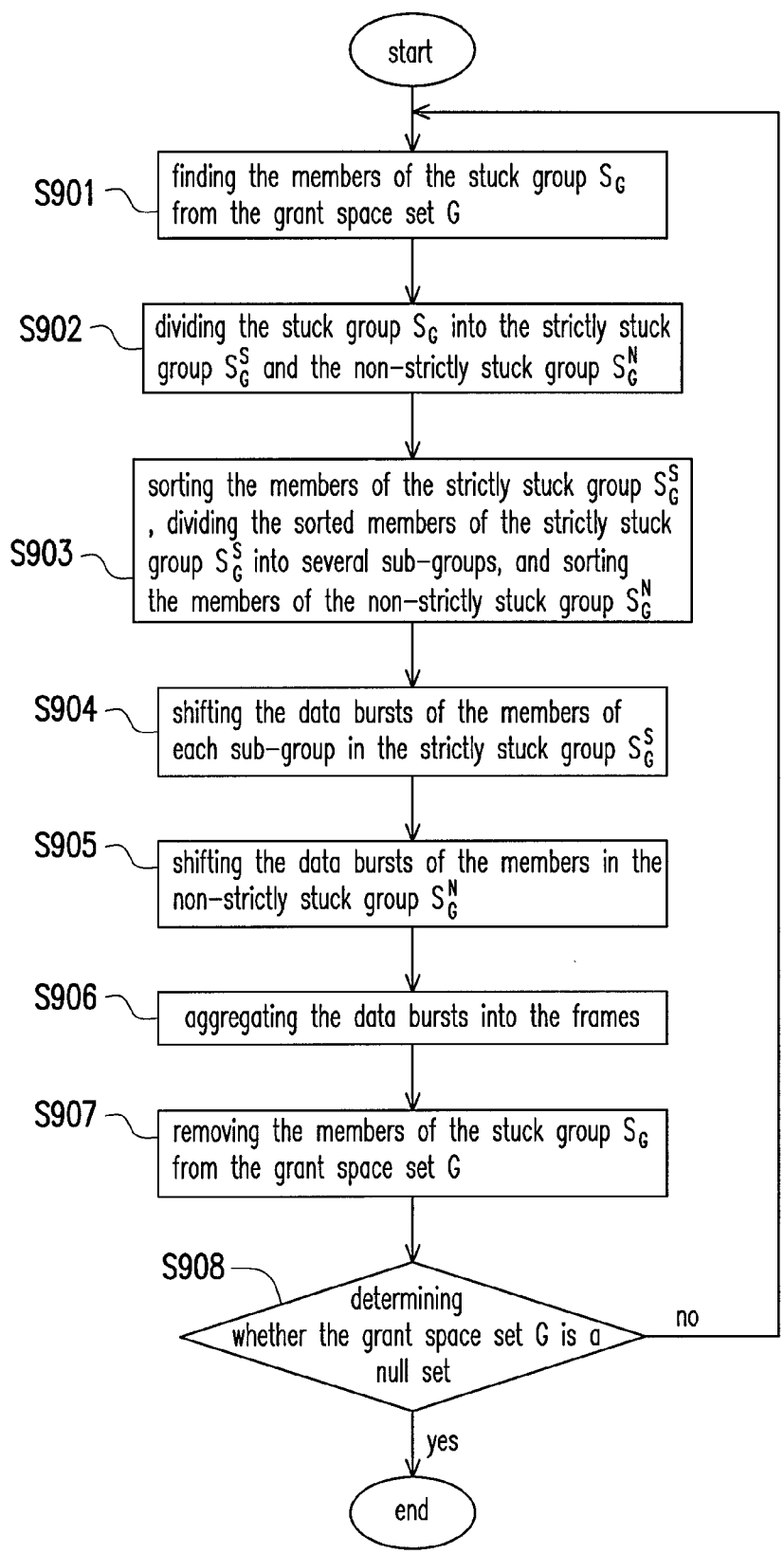
FIG. 9 is a flow chart showing detailed steps of the frame aggregation procedure in the step S501 or S511 according to one exemplary embodiment of the present disclosure.

Still referring to FIG. 4, FIG. 4 is taken as an exemplary example to illustrate the packet scheduling method provided by the exemplary example of the present disclosure. The exemplary example of FIG. 4 is the exemplary example which the frame aggregation procedure at step S501 of FIG. 5A or at step S511 of FIG. 5B is used to schedule the data bursts in FIG. 4, and the detailed steps of step S501 or S511 are illustrated in FIG. 9. When the data bursts in FIG. 4 are scheduled by using the frame aggregation procedure, a stuck group $S_G$ must be found from grant spaces, and the stuck group $S_G$ is divided into a strictly stuck group $S_G^S$ and a non-strictly stuck group $S_G^N$. Then the members in the strictly stuck group $S_G^S$ are divided into several sub-groups. After the above steps are executed, the data bursts of the members of the sub-groups in the strictly stuck group $S_G^S$ and the data bursts of the members in the non-strictly stuck group $S_G^N$ are shifted and aggregated into the frames, i.e. the frame aggregation procedure is performed thereon. The following description will illustrate definitions of the stuck group $S_G$, strictly stuck group $S_G^S$, and non-strictly stuck group $S_G^N$, and how to shift the data bursts and aggregate the data bursts into the frames.

Assuming a grant space set G having a plurality of grant spaces is given, then the stuck group $S_G$ of the grant space set G can be defined as $S_G=\{\xi \in G | F_s(\xi) \le x_g\}$, wherein $x_g$ is $\min\{F_t(G)\}$, and called stuck frame index, the frame corresponding the stuck frame index is called the stuck frame, the function $\min\{\cdot\}$ is used to find the minimum element of combinations of the input variables thereof, the functions $F_s(\cdot)$ and $F_t(\cdot)$ are respectively used to find start frame index and the termination frame index of the grant space input into the two functions.

In the given grant space G, the details for obtaining the stuck group $S_G$ is illustrated as follows. First, the data bursts in the given grant space G are shifted backward to the frames corresponding the most rear frame indices which meet the delay constraint thereof. Then, the minimum of frame indices of the frames to which the data bursts shifted is found, i.e. finding $\min\{F_t(G)\}$ as the stuck frame index $x_g$. Next, the grant spaces having the start frame indices which are less than or equal to the stuck frame index $x_g$ are found, and the group of these grant spaces is the stuck group $S_G$.

For example, in FIG. 4, the data bursts B411, B421, B431, B441, B451, B461, B471, B481, B491 for connections CID1-CID9 can be shifted to the frames corresponding the most rear frame indices of 7, 5, 5, 6, 5, 5, 5, 5, 5. Thus the stuck frame index $x_{g1}$ of the stuck group $S_{G1}$ is found to be 5, i.e. $x_{g1}$=5, and the stuck group $S_{G1}$ contains the grant spaces $G_{411}$, $G_{421}$, $G_{431}$, $G_{441}$, $G_{451}$, $G_{461}$, $G_{471}$, $G_{481}$, $G_{491}$ respectively presenting the data bursts B411, B421, B431, B441, B451, B461, B471, B481, B491.

The stuck group $S_G$ can be divided into strictly stuck group $S_G^S$ and non-strictly stuck group $S_G^N$, the strictly stuck group $S_G^S$ is defined as $S_G^S=\{\xi \in S_G | F_t(\xi)=x_g\}$, and the non-strictly stuck group $S_G^N$ is defined as $S_G^N=S_G-S_G^S$. In short, the data bursts of the members in the non-strictly stuck group $S_G^N$ can be further shifted to the frames corresponding to the frame indices being larger than the stuck frame index $x_g$. However, the data bursts of the members in the strictly stuck group $S_G^S$ at most can be shifted to the frame corresponding to the stuck frame index $x_g$. For example, in FIG. 4, the grant spaces $G_{421}$, $G_{431}$, $G_{451}$, $G_{461}$, $G_{471}$, $G_{481}$, $G_{491}$ in the stuck group $S_{G1}$ are the members of the strictly stuck group $S_{G1}^S$, and the grant spaces $G_{411}$, $G_{441}$ in the stuck group $S_{G1}$ are the members of the non-strictly stuck group $S_{G1}^N$.

Next, after dividing the stuck group $S_{G1}$ into the strictly stuck group $S_G^S$ and the non-strictly stuck group $S_G^N$, the members of the strictly stuck group $S_G^S$ and the non-strictly stuck group $S_G^N$ are sorted. The members (i.e. grant spaces) of the strictly stuck group $S_G^S$ are sorted according to the order of the termination frame indices of the members, and that is, the more rear the termination index of the member is, the more rear the member is sorted. If the termination frame indices of the members of the strictly stuck group $S_G^S$ are identical, the members with the identical termination frame indices are sorted according to the order of the start frame indices thereof, and that is, the more front the start frame index of the member with the identical termination frame index is, the more front of the member is sorted. The members (i.e. grant spaces) of the non-strictly stuck group $S_G^N$ can be sorted by using the deduction of the similar sorting manner for sorting the members of the strictly stuck group $S_G^S$, and the similar description is omitted herein.

Figure 6:
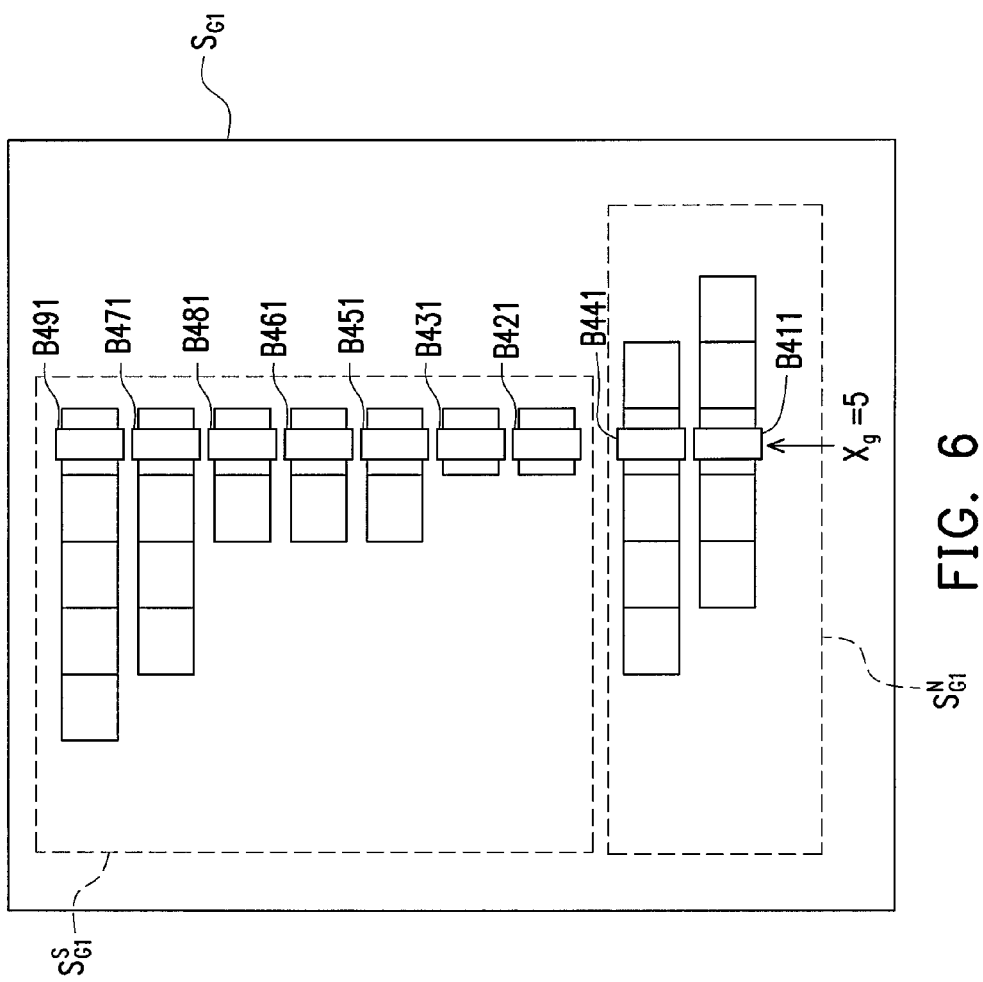
FIG. 6 is schematic diagram showing sorting manner of the members of the stuck group $S_{G1}$ according to an exemplary embodiment of the present disclosure.

Referring to FIG. 6, FIG. 6 is schematic diagram showing sorting manner of the members of the stuck group $S_{G1}$ according to an exemplary embodiment of the present disclosure. As shown in FIG. 6, the stuck group $S_{G1}$ is divided into the strictly stuck group $S_{G1}^S$ and the non-strictly stuck group $S_{G1}^N$. The members of the strictly stuck group $S_{G1}^S$ after sorted are respectively the grant spaces $G_{491}$, $G_{471}$, $G_{481}$, $G_{461}$, $G_{451}$, $G_{431}$, $G_{421}$ from top to bottom. The members of the non-strictly stuck group $S_{G1}^N$ after sorted are respectively the grant spaces $G_{441}$, $G_{411}$ from top to bottom. It is noted that, according to the above description, the order of the members (i.e. grant spaces) in FIG. 6 is not limited, for example, in the other exemplary embodiment, the members of the strictly stuck group $S_{G1}^S$ after sorted may respectively be the grant spaces $G_{491}$, $G_{471}$, $G_{461}$, $G_{451}$, $G_{481}$, $G_{421}$, $G_{431}$ from top to bottom.

After the members (i.e. grant spaces) of the strictly stuck group $S_G^S$ and the non-strictly stuck group $S_G^N$ are sorted, the members of the strictly stuck group $S_G^S$ are divided into several sub-groups. Assuming a number of the members of the stuck group $S_G^S$ is $N_s$, the members of the strictly stuck group $S_G^S$ are divided into $ceil(N_s/F_{max})$ sub-groups, wherein the function ceil(•) is used to obtain a minimum integer (i.e. also called a ceiling number) which is larger or equal to the input variable thereof. In this exemplary embodiment, the number of the sub-groups is presented as $P_n$, wherein $P_n=ceil(N_s/F_{max})$. Next, the data burst of the member in the $i^{th}$ sub-group is shifted to the frame corresponding to the stuck frame index $x_g$ minus $P_n-i$. If the data burst of the member in the $i^{th}$ sub-group is unable to be shifted to the frame corresponding to the stuck frame index $x_g$ minus $P_n-i$, the data burst will be shifted to the frame corresponding to the start frame index thereof from the stuck frame index $x_g$. Next, the data bursts of the members in the non-strictly stuck group $S_G^N$ are shifted forward to at least one frame which has at least one data burst contained therein and enough space to contain the other data bursts. Last, the data bursts in the frames of the stuck group $S_G$ are aggregate to the frames, therefore reducing the number of the frames containing the data bursts. In other word, in the case that there are data bursts for multiple connections, if the MSS adapts the above frame aggregation procedure to schedule the data bursts and aggregate the data bursts to the frames, the total time length of the listen intervals of the MSS can be reduced, therefore achieve power saving.

Figure 7:
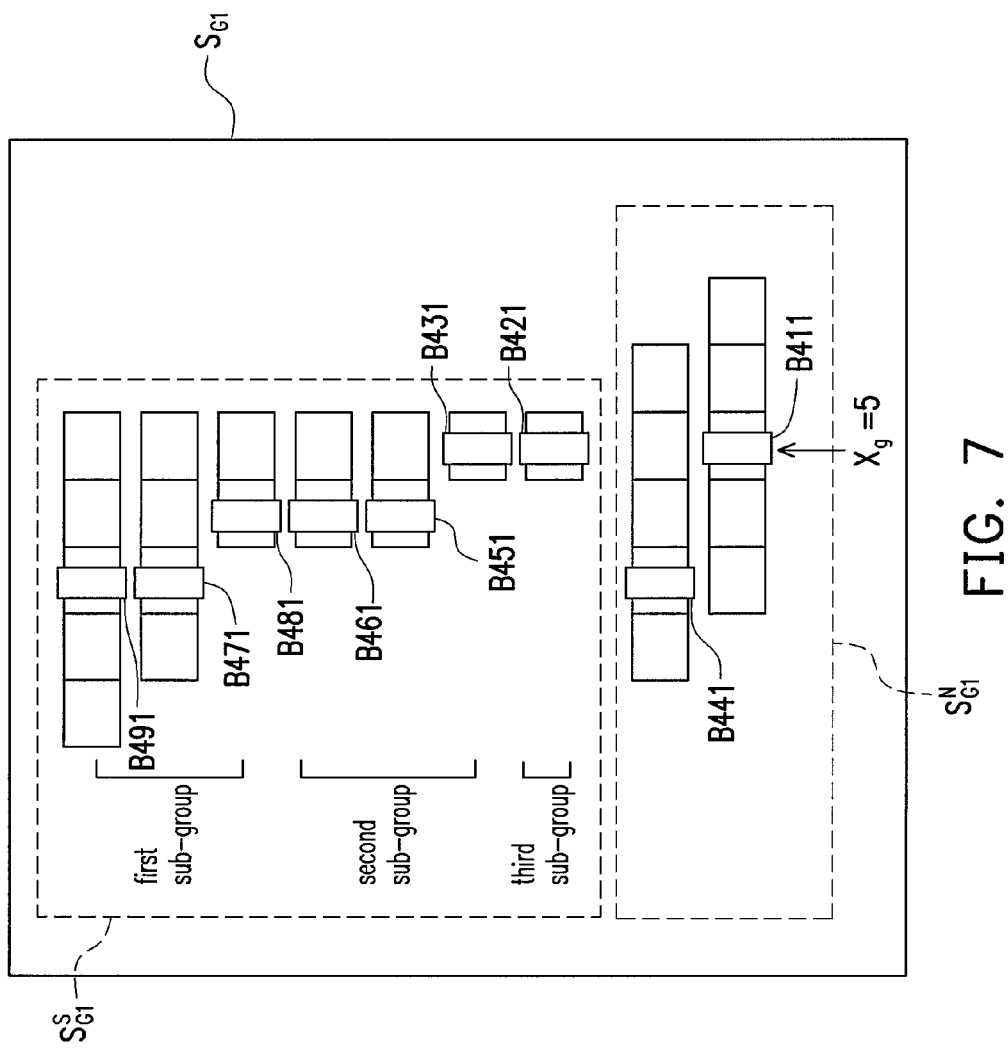
FIG. 7 is a schematic diagram showing how to aggregate the data bursts of the members in the stuck group $S_{G1}$ to the frames according to an exemplary embodiment of the present disclosure.

Referring to FIG. 7, FIG. 7 is a schematic diagram showing how to aggregate the data bursts of the members in the stuck group $S_{G1}$ to the frames according to an exemplary embodiment of the present disclosure. In FIG. 7, when each frame of the MSS is assumed to accommodate at most 3 data bursts, i.e. the data burst accommodated number $F_{max}$ of the frame is 3, the grant spaces $G_{491}$, $G_{471}$, $G_{481}$ in the strictly stuck group $S_{G1}^S$ are divided into the first sub-group, the grant spaces $G_{461}$, $G_{451}$, $G_{431}$ in the strictly stuck group $S_{G1}^S$ are divided into the second sub-group, and the grant space $G_{421}$ in the strictly stuck group $S_G^S$ is divided into the third sub-group.

The data bursts B491, B471 of the grant spaces $G_{491}$, $G_{471}$ in the first sub-group are shifted to the frame corresponding to the frame index of 3 (i.e. $x_g-(3-1)=5-2=3$). The data burst B481 of the grant spaces $G_{481}$ in the first sub-group is unable to be shifted to the frame corresponding to the frame index of 3, and thus the data burst B481 of the grant spaces $G_{481}$ in the first sub-group is shifted to the frame corresponding the frame index of 4 (i.e. the start frame index of the grant space $G_{481}$). The data bursts B461, B451 of the grant spaces $G_{461}$, $G_{451}$ in the second sub-group are shifted to the frame corresponding to the frame index of 4 (i.e. $x_g-(3-2)=5-1=4$). The data burst B431 of the grant spaces $G_{431}$ in the second sub-group is unable to be shifted to the frame corresponding to the frame index of 4, and thus the data burst B431 of the grant spaces $G_{431}$ in the second sub-group is not shifted, that is, the data burst B431 of the grant spaces $G_{431}$ is still in the frame corresponding the frame index of 5 (i.e. the start frame index of the grant space $G_{431}$). In addition the data burst B421 of the grant space $G_{421}$ is not shifted, either.

Next, since the frame corresponding to the frame index of 3 can still accommodate one data burst, the data burst B441 of the grant space $G_{441}$ in the non-strictly stuck group $S_{G1}^N$ is shifted to the frame corresponding to the frame index of 3. In the similar manner, since the frame corresponding to the frame index of 5 can still accommodate one data burst, the data burst B411 of the grant space $G_{411}$ in the non-strictly stuck group $S_{G1}^N$ is not shifted, and is still in the frame corresponding to the frame index of 5. Finally, all of the scheduled data bursts B411, B421, B431, B441, B451, B461, B471, B481, B491 are aggregated into the frames corresponding to the frame indices of 3-5, and the frame indices which the corresponding frames have the data bursts form a listen interval, and the frame indices which the corresponding frames do not have any data bursts form the sleep intervals of the MSS.

In addition, it is noted that, the above manner for aggregating the data bursts into the frames is one exemplary embodiment of the present disclosure, and it is not used to limit the present disclosure. For example, the data bursts B491, B471, B441 of the grant spaces $G_{491}$, $G_{471}$, $G_{441}$ may be shifted to the frame corresponding the frame index of 2, and then are aggregated into this frame.

Still referring to FIG. 4, after the data bursts B411, B421, B431, B441, B451, B461, B471, B481, B491 are aggregated into the frames, the grant spaces $G_{411}$, $G_{421}$, $G_{431}$, $G_{441}$, $G_{451}$, $G_{461}$, $G_{471}$, $G_{481}$, $G_{491}$, used to present the data bursts B411, B421, B431, B441, B451, B461, B471, B481, B491 are removed from the grant space set G. Then, another stuck group is found from the grant space set G after the above grant spaces are removed, and the strictly stuck group and non-strictly stuck group are divided from the current stuck group. Next, the grant spaces in the stuck group are sorted, and the data bursts are scheduled and then aggregated into the frames.

For example, in FIG. 4, after the data burst B411, B421, B431, B441, B451, B461, B471, B481, B491 are aggregated into the frames, the members of the stuck group $S_{G2}$ are found from the grant space set G. According to the above definition, the members of the stuck group $S_{G2}$ comprises the grant spaces $G_{432}$, $G_{442}$, $G_{452}$ used to present the data bursts B432, B442, B452, wherein the grant space $G_{452}$ is in the strictly stuck group $S_{G2}^S$, and the grant spaces $G_{432}$, $G_{442}$ are in the non-strictly stuck group $S_{G2}^N$. Next, the data bursts B432, B442, B452 are aggregated into the frame corresponding to the frame index of 8.

Figure 8:
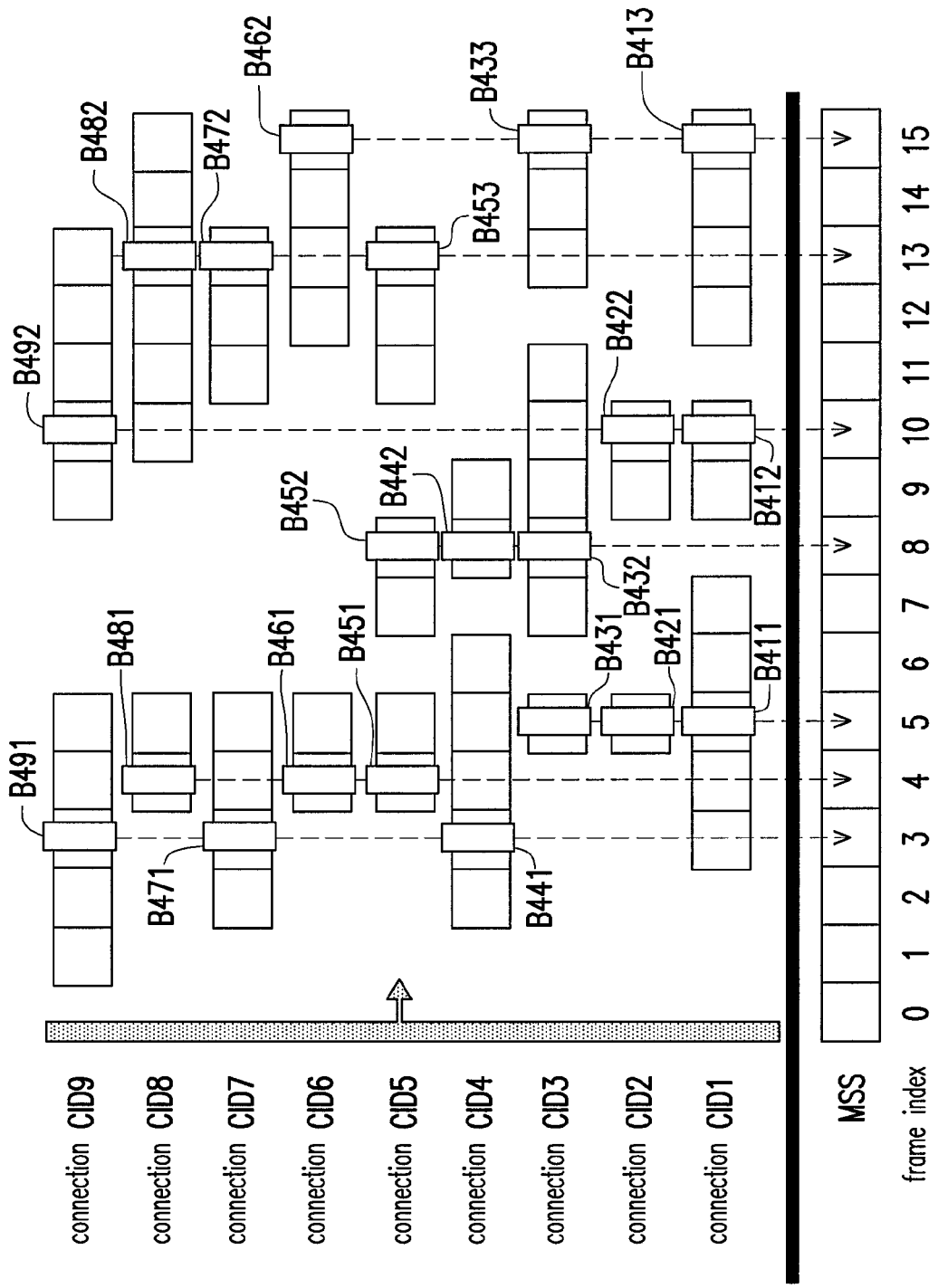
FIG. 8 is a schematic diagram showing the results after the data bursts in FIG. 4 are processed by the frame aggregation procedure according to one exemplary embodiment of the present disclosure.

Deduced from the above manner for aggregating the data bursts into the frames, the other data bursts B412, B413, B422, B433, B453, B462, B472, B482, B492 in FIG. 4 can be aggregated into the frames corresponding to the frame indices of 10, 13, 15 (shown in FIG. 8), and the details are omitted herein. Referring to FIG. 8, FIG. 8 is a schematic diagram showing the results after the data bursts in FIG. 4 are processed by the frame aggregation procedure according to one exemplary embodiment of the present disclosure. In FIG. 8 each frame having the data bursts is filled with the data bursts as more as possible, thus the length of the listen intervals of the MSS can be reduced, and the length of the sleep intervals is increased.

Next, referring to FIG. 9, FIG. 9 is a flow chart showing detailed steps of the frame aggregation procedure in step S502 or S522 according to one exemplary embodiment of the present disclosure. First, at step S901, the members of the stuck group $S_G$ are found from the grant space set G, wherein the definition of the stuck group $S_G$ is described above, therefore omitting the repeated description. At step S902, the stuck group $S_G$ is divided into the strictly stuck group $S_G^S$ and the non-strictly stuck group $S_G^N$, wherein definitions of the strictly stuck group $S_G^S$ and the non-strictly stuck group $S_G^N$ are described above, therefore omitting the repeated description.

Next, at step S903, the members of the strictly stuck group $S_G^S$ are sorted and then divided into several sub-groups, and the members of the non-strictly stuck group $S_G^N$ are also sorted, wherein how to sort the members of the strictly stuck group $S_G^S$ and the non-strictly stuck group $S_G^N$, and how to divide the members of the strictly stuck group $S_G^S$ into the sub-groups are illustrated in above description, therefore omitting the repeated description herein. Next, at step S904, the data bursts of the members of each sub-group in the strictly stuck group $S_G^S$ are shifted, wherein how to shift data bursts of the members of each sub-group in the strictly stuck group $S_G^S$ is described above, therefore omitting the repeated description herein. Next, at step S905, the data bursts of the members in the non-strictly stuck group $S_G^N$ are shifted, wherein how to shift the data bursts of the members in the non-strictly stuck group $S_G^N$ is described above, therefore omitting the repeated description herein.

Then, at step S906, the data bursts are aggregated into the frames. Next, at step S907, the members of the stuck group $S_G$ are removed from the grant space set G. Next, at step S908, whether the grant space set G is a null set is determined. If the grant space set G is not the null set, it means the grant space set G still has the data bursts not being scheduled and aggregated into the frames, and the frame aggregation procedure will go back to step S901. If the grant space set G is the null set, it means all of the data bursts in the grant space set G are scheduled and aggregated into the frames, and the frame aggregation procedure will end. It is noted that, if a number of the data bursts in a frame is larger than a data burst accommodated number $F_{max}$ of the frame, the flow must jump from step S906 to the backward adjustment procedure (i.e. step S502 or S522). The backward adjustment procedure is described as follows.

In the exemplary embodiment of FIG. 4, after the data bursts are scheduled, the condition that a number of the data bursts in a frame is larger than a data burst accommodated number $F_{max}$ of the frame does not occur. However, in the practical example, the data burst accommodated number $F_{max}$ of the frame may be not large, and thus the condition that the number of the data bursts in a frame is larger than the data burst accommodated number $F_{max}$ of the frame does occur. To solve this problem, the backward adjustment procedure of step S502 in FIG. 5A or step S522 in FIG. 5C will shift the data bursts of the sub-groups sorted in front shift forward to the frame corresponding the more front frame indices, such that the frame corresponding to the rear frame indices can accommodate the data bursts of the sub-groups sorted in back.

Figure 10:
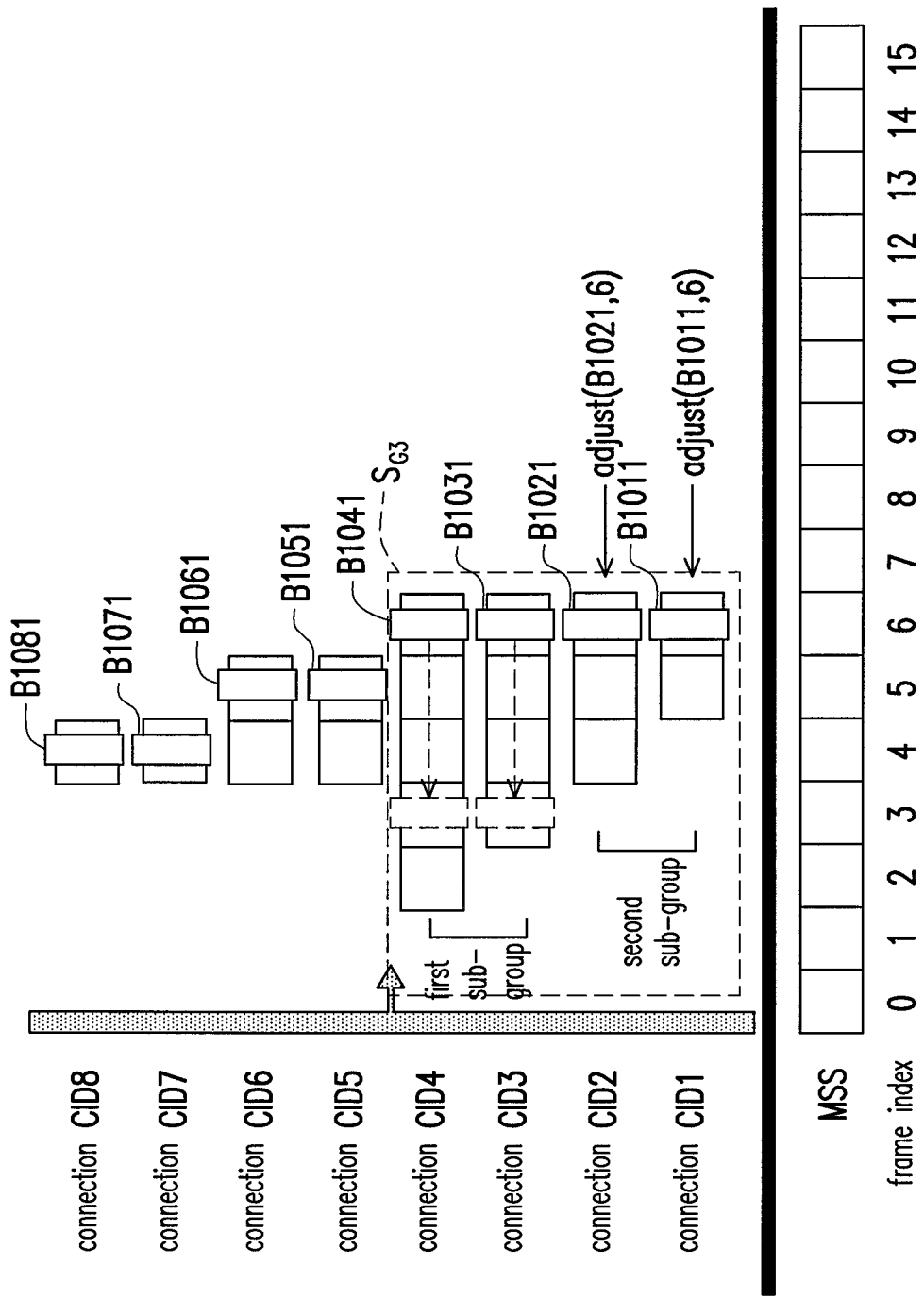
FIG. 10 is a schematic diagram showing the condition that the number of the data bursts in a frame is larger than the data burst accommodated number $F_{max}$ of the frame after the data bursts for multiple connections of the MSS are scheduled according to one exemplary embodiment of the present disclosure.

Referring to FIG. 10, FIG. 10 is a schematic diagram showing the condition that the number of the data bursts in a frame is larger than the data burst accommodated number $F_{max}$ of the frame after the data bursts for multiple connections of the MSS are scheduled according to one exemplary embodiment of the present disclosure. In this exemplary embodiment, the data burst accommodated number $F_{max}$ of the frame is assumed to be 2 (i.e. $F_{max}=2$). After the frame aggregation procedure is first executed, the data burst B1081, B1071 are aggregated into the frame corresponding to the frame index of 4.

Next, after the frame aggregation procedure is second executed, the data bursts B1061 and 1051 are aggregated into the frames corresponding to the frame index of 5. When the frame aggregation procedure is third executed, the stuck group $S_{G3}$ merely has the strictly stuck group $S_{G3}^S$, and the members of the strictly stuck group $S_{G3}^S$ comprises grant spaces representing the data bursts B1041, B1031, B1021, B1011, and the grant spaces are divided into two sub-groups. According to the above frame aggregation procedure, the data bursts B1041, B1031 are shifted to the frames corresponding to the frame index of 5, but since the frame corresponding to the frame index of 5 has contained the data bursts B1061 and B1051, the data bursts B1041 and B1031 would be in frame corresponding to the frame index of 6. In this case, the data bursts B1021 and 1011 are unable to be aggregated into some frame, and therefore the backward adjustment procedure should be executed, such that the data bursts B1041 and B1031 can be shifted to and aggregated into the other frame corresponding to the frame index less than 6, and then the data bursts B1011 and B1021 can be aggregated into the frame corresponding to the frame index of 6. For example, the bursts B1041 and B1031 can be shift to the other frame corresponding to the frame index of 3, and thus the data bursts can be aggregated into the frame corresponding to the frame index of 6.

By contrast, if the data burst $\lambda$ can not be shifted to the frame corresponding to the target frame index $\theta$, an output the backward adjustment function adjust$(\lambda,\theta)$ will be false, and then the data burst of the grant space $G_\xi$ having a minimum start frame index $s_\xi$ is found from the data bursts of the grant spaces in the frame corresponding the frame index of $\theta$, and the found data burst is served as the data burst $\lambda$ for the next recursion. Then, for $\pi$ is an integer from $\theta-1$ through $s_\xi$, the backward adjustment function adjust$(\xi, \pi)$ is sequentially and recursively executed, until the output of backward adjustment function adjust$(\xi, \pi)$ is true.

Still referring to FIG. 10, it is obvious that the backward adjustment function adjust(B1021,6) is calculated, and since the data burst B1021 can not be shifted to the frame corresponding to the frame index of 6, the output of the backward adjustment function adjust(B1021,6) is false. The data bursts in the frame corresponding to the frame index of 6 are the data bursts B1031 and B1041, wherein the grant space representing the data burst B1041 has the minimum start frame index. Thus, the backward adjustment function adjust(B1041,5) is calculated. The data burst B1041 can not be shifted to the frame corresponding to the frame index of 5, and thus the output of the backward adjustment function adjust(B1041,5) is false. The data bursts in the frame corresponding to the frame index of 5 are the data bursts B1051 and B1061, wherein the grant space representing the data burst B1061 has the minimum start frame index. Thus, the backward adjustment function adjust(B1061,4) is calculated. The data burst B1061 can not be shifted to the frame corresponding to the frame index of 4, and thus the output of the backward adjustment function adjust(B1061,4) is false.

The data bursts in the frame corresponding to the frame index of 4 are the data bursts B10571 and B1081, but since the data bursts B1071 and B1081 can not be shifted any more, the backward adjustment function adjust(B1041,4) is then calculated. The data burst B1041 can not be shifted to the frame corresponding to the frame index of 4, and thus the output of the backward adjustment function adjust(B1041,4) is false.

The data bursts B1051 and B1061 at most can be shifted to the frame corresponding to the frame index of 4, and therefore the backward adjustment function adjust(B1041,3) is calculated. The data burst B1041 can be shifted to the frame corresponding to the frame index of 3, thus the output of the backward adjustment function adjust(B1041,3) is true, and the data burst B1041 is shifted to the frame corresponding to the frame index of 3.

In the similar manner, regarding the data burst B1011, the backward adjustment function adjust(B1011,6) is first calculated, and the output of the backward adjustment function adjust(B1011,6) is false. Then, the backward adjustment function adjust(B1031,5) is calculated, and the output of the backward adjustment function adjust(B1031,5) is false. Next the backward adjustment function adjust(B1061,4) is calculated, and the output of the backward adjustment function adjust(B1061,4) is false. Next, the backward adjustment function adjust(B1031,4) is calculated, and the output of the backward adjustment function adjust(B1031,4) is false. Then, the backward adjustment function adjust(B1031,3) is calculated, and since the data burst B1031 can be shifted to the frame corresponding to the frame index of 3, the output of the backward adjustment function adjust(B1031,3) is true, and the data burst B1031 is shifted to the frame corresponding to the frame index of 3.

Figure 11:
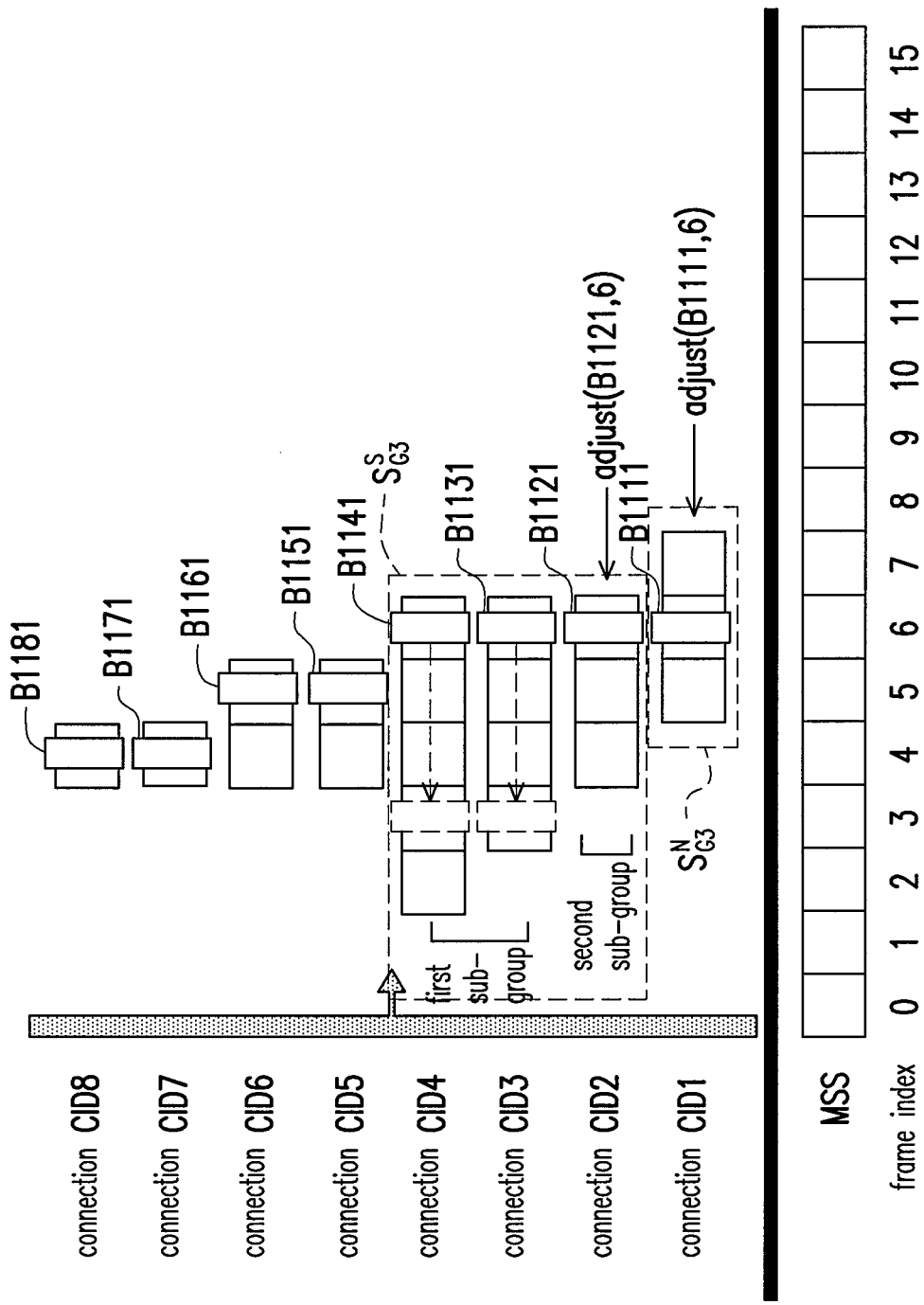
FIG. 11 is another schematic diagram showing another condition that the number of the data bursts in a frame is larger than the data burst accommodated number $F_{max}$ of the frame after the data bursts for multiple connections of the MSS are scheduled according to another exemplary embodiment of the present disclosure.

Herein, another example is used to further illustrate the backward adjustment procedure. Referring to FIG. 11, FIG. 11 is another schematic diagram showing another condition that the number of the data bursts in a frame is larger than the data burst accommodated number $F_{max}$ of the frame after the data bursts for multiple connections of the MSS are scheduled according to another exemplary embodiment of the present disclosure. In this exemplary embodiment, the data burst accommodated number $F_{max}$ of the frame is assumed to be 2 (i.e. $F_{max}=2$). After the frame aggregation procedure is first executed, the data burst B1181, B1171 are aggregated into the frame corresponding to the frame index of 4.

Next, after the frame aggregation procedure is second executed, the data bursts B1161 and 1151 are aggregated into the frames corresponding to the frame index of 5. When the frame aggregation procedure is third executed, the stuck group $S_{G3}$ comprises a strictly stuck group $S_{G3}^{S}$ and a non-strictly stuck group $S_{G3}^{N}$. The members of the strictly stuck group $S_{G3}^{S}$ comprise the grant spaces representing the data bursts B1141, B1131, and B1121, and the grant spaces representing the data bursts B1141, B1131, B1121 are divided into two sub-groups. In addition, the member of the non-strictly stuck group $S_{G3}^{N}$ comprises the grant space representing the data burst B1111. According to the above frame aggregation procedure, the data bursts B1141, B1131 are shifted to the frame corresponding to the frame index of 5, but since the frame corresponding to the frame index of 5 has contained the data bursts B1161, B1151, the data bursts B1141, B1131 would in the frame corresponding to the frame index of 6. The data bursts B1121, B1111 can not be aggregated into the frame corresponding to the other frame index, and therefore the backward adjustment procedure should be executed. Accordingly, the data bursts B1141, B1131 can for example shifted to the frame corresponding to the frame index of 3, and thus the data bursts B1121, B111 can be aggregated into the frame corresponding to the frame index of 6.

Still referring to FIG. 11, regarding the data burst B1121, it is obvious that the backward adjustment function adjust(B1121,6) is firstly calculated, and the output of the backward adjustment function adjust(B1121,6) is false. Then the backward adjustment function adjust(B1141,5) is calculated, and the output of the backward adjustment function adjust (B1141,5) is false. Next, the backward adjustment function adjust(B1161,4) is calculated, and the output of the backward adjustment function adjust(B1161,4) is false. Next, the backward adjustment function adjust(B1141,4) is calculated, and the output of the backward adjustment function adjust(B1141,4) is false. Then the backward adjustment function adjust(B1141,3) is calculated, and since the data burst B1141 can be shifted to the frame corresponding to the frame index of 3, the output of the backward adjustment function adjust(B1141,3) is true, and then the data burst B1141 is shifted to the frame corresponding to the frame index of 3.

In the similar manner, regarding the data burst B1111, the backward adjustment function adjust(B1111,6) is firstly calculated, and the output of the backward adjustment function adjust(B1111,6) is false. Next, the backward adjustment function adjust(B1131,5) is calculated, and the output of the backward adjustment function adjust(B1131,5) is false. Next, the backward adjustment function adjust(B1061,4) is calculated, and the output of the backward adjustment function adjust(B1161,4) is false. Next, the backward adjustment function adjust(B1131,4) is calculated, and the output of the backward adjustment function adjust(B1131,4) is false. Then the backward adjustment function adjust(B1131,3) is calculated, and since the data burst B1031 can be shifted to the frame corresponding to the frame index of 3, the output of the backward adjustment function adjust(B1131,3) is true, and then the data burst B1131 is shifted to the he frame corresponding to the frame index of 3.

Figure 12:
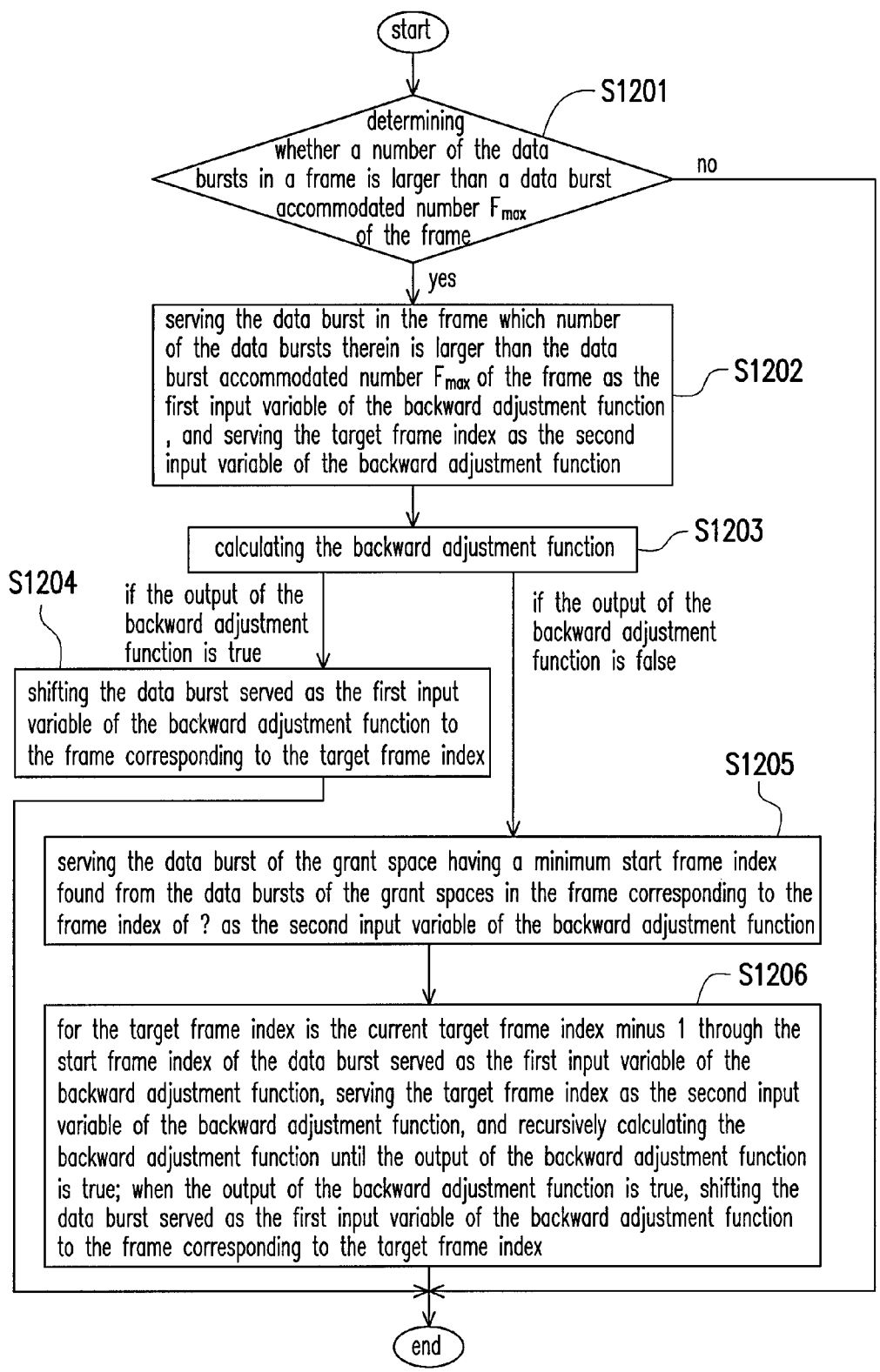
FIG. 12 is a flow chart showing detailed steps of the backward adjustment procedure in the step S502 or S522 according to one exemplary embodiment of the present disclosure.

Referring to FIG. 12, FIG. 12 is a flow chart showing detailed steps of the backward adjustment procedure in the step S502 or S522 according to one exemplary embodiment of the present disclosure. First, as step S1201, whether a number of the data bursts in a frame is larger than a data burst accommodated number $F_{max}$ of the frame is determined. If the number of the data bursts in the frame is not larger than the data burst accommodated number $F_{max}$ of the frame, it means no backward adjustment procedure is needed; otherwise, step S1202 would be executed. At step S1202, the data burst in the frame which number of the data bursts therein is larger than the data burst accommodated number $F_{max}$ of the frame is served as the first input variable of the backward adjustment function, and the target frame index is served as the second input variable of the backward adjustment function. At step S1203, the backward adjustment function is calculated. At step S1204, if the output of the backward adjustment function is true, the data burst served as the first input variable of the backward adjustment function to the frame corresponding will be shifted to the target frame index, and then the packet scheduling method is ended. At step S1205, if the output of the backward adjustment function is false, the data burst of the grant space having a minimum start frame index found from the data bursts of the grant spaces in the frame corresponding to the frame index of θ is served as the second input variable of the backward adjustment function. At step S1206, for the target frame index is the current target frame index minus 1 through the start frame index of the data burst served as the first input variable of the backward adjustment function, the target frame index is served as the second input variable of the backward adjustment function, and the backward adjustment function is calculated recursively until the output of the backward adjustment function is true. When the output of the backward adjustment function is true, the data burst served as the first input variable of the backward adjustment function to the frame corresponding is shifted to the target frame index, and then the packet scheduling method is ended. The definition of the backward adjustment function is described above, therefore omitting the repeated description herein.

Figure 13:
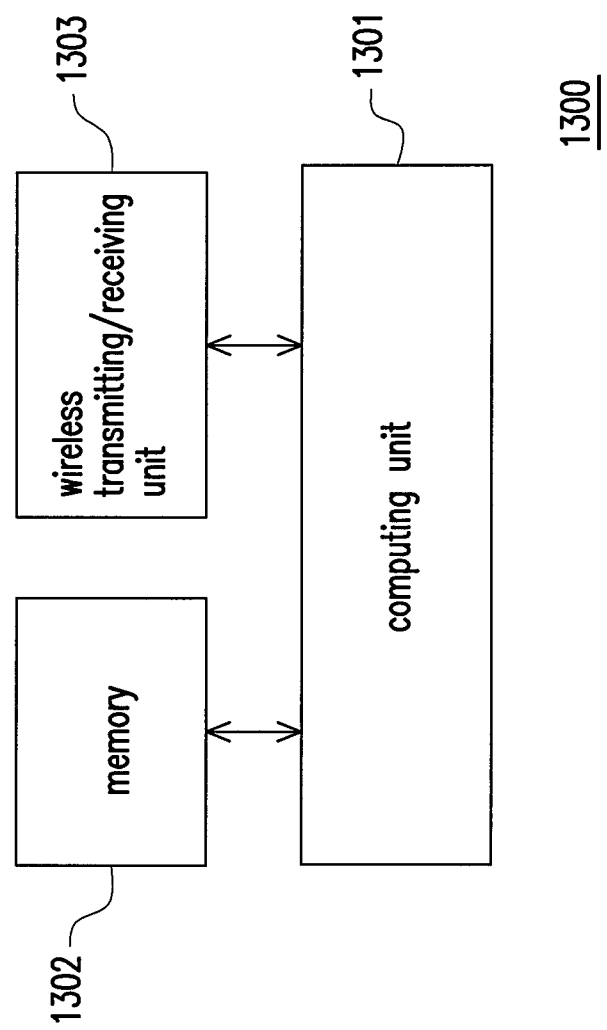
FIG. 13 is a block diagram of a communication apparatus for executing the packet scheduling method according to one exemplary embodiment of the present disclosure.

Finally, referring to FIG. 13, FIG. 13 is a block diagram of a communication apparatus for executing the packet scheduling method according to one exemplary embodiment of the present disclosure. The communication apparatus 1300 comprises a computing unit 1301, a memory 1302, and a wireless transmitting/receiving unit 1303, wherein the computing unit 1301 is connected to the memory 1302 and wireless transmitting/receiving unit 1303. The memory 1302 comprises program codes for executing one of the packet scheduling methods in FIG. 5A through FIG. 5C. The computing unit 1301 is used to execute the program codes, so as to control the wireless transmitting/receiving unit 1303 schedule the data bursts for the connections, and aggregate them into the frames. Accordingly, one of the packet scheduling methods in FIG. 5A through FIG. 5C can be implemented. As stated above, the communication apparatus can be used in the currently used communication systems, such as WiMax system.

To sum up, the packet scheduling method provided by exemplary embodiments of the present disclosure can let the MSS having connections aggregate the data bursts of the connections into part of frames, so as to reduce the total time length of the listen intervals of the MSS, and increase the total time length of the sleep intervals of the MSS. Accordingly, the end of power saving is achieved.

It will be apparent to those skilled in the art that various modifications and variations can be made to the structure of the present disclosure without departing from the scope or spirit of the disclosure. In view of the foregoing descriptions, it is intended that the present disclosure covers modifications and variations of this disclosure if they fall within the scope of the following claims and their equivalents.

What is claimed is:

1. A packet scheduling method, used to aggregate unscheduled data bursts of grant spaces in a grant space set into frames, wherein each grant space comprises a start frame index, a termination frame index, and a data frame index, and the packet scheduling method comprises:
   step 1, finding a minimum of the termination frame indices of the grant spaces in the grant space set as a stuck frame index;
   step 2, finding a stuck group according to the start frame indices of the grant spaces in the grant space set and the stuck frame index, and shifting the data bursts of the stuck group to a frame corresponding to the stuck frame index; and
   step 3, shifting the data bursts of the grant spaces of the stuck group in the frame corresponding to the stuck frame index;
   wherein step 3 comprises:
   step 3-1, dividing the grant spaces in the stuck group into a strictly stuck group and a non-strictly stuck group according to the termination frame indices of the grant spaces in the stuck group and the stuck frame index;
   step 3-2, sorting the grant spaces in the strictly stuck group according to the start frame indices of the grant spaces in the strictly stuck group, and dividing the sorted grant spaces in the strictly stuck group into several sub-groups according to a data burst accommodated number of the frame and a number of the grant spaces in the strictly stuck group, wherein the sub-groups comprises a first through $N^{th}$ sub-groups, and N is a number of the sub-groups;
   step 3-3, sorting the grant spaces in the non-strictly stuck group according to the termination frame indices and the start frame indices of the grant spaces in the non-strictly stuck group;
   step 3-4, for i is equal to 1 through N, shifting the data bursts in the frame corresponding to the stuck frame index of the grant spaces in the $i^{th}$ sub-groups according to values of i and N; and
   step 3-5, shifting the data bursts in the frame corresponding to the stuck frame index of the grant spaces of the non-strictly stuck group according to frame indices of the frames to which the data bursts are shifted in the grant spaces of the strictly stuck group;
   wherein at step 3-4, shifting the data bursts in the frame corresponding to the stuck frame index of the grant spaces in the $i^{th}$ sub-group to the frame corresponding to the frame index being equal to the stuck frame index minus N–i, if the data burst is unable to be shifted to the frame corresponding to the frame index being equal to the stuck frame index minus N–i, shifting the data burst to the frame corresponding the frame index which the data burst is unable to be shifted forward anymore.

2. The packet scheduling method according to claim 1, further comprising:
   step 4, aggregating the data bursts in the grant spaces of the stuck group to the frames corresponding to frame indices to which the data bursts are shifted.

3. The packet scheduling method according to claim 1, further comprising:
   step 5, removing the grant spaces of the stuck group from the grant space set;
   step 6, determining whether the grant space set is a null set, if the grant space set is the null set, ending the packet scheduling method, and if the grant space set is not the null set, continuing to execute step 1 through step 3.

4. The packet scheduling method according to claim 1, wherein at step 2, finding the grant spaces in the grant space set with the start frame indices being less than or equal to the stuck frame index as the grant spaces of the stuck group.

5. The packet scheduling method according to claim 1, wherein at step 3-1, finding the grant spaces of the stuck group with the termination frame indices being equal to the stuck frame index as the grant spaces of the strictly stuck group, and finding the grant spaces of the stuck group with the termination frame indices not being equal to the stuck frame index as the grant spaces of the non-strictly stuck group.

6. The packet scheduling method according to claim 1, wherein at step 3-2, an order of the grant spaces in the strictly stuck group is the same as an order of the start frame indices of the grant spaces in the strictly stuck group, and the value of N is a ceiling integer of a number of the grant spaces in the strictly stuck group divided by the data burst accommodated number, and the sorted grant spaces of every data burst accommodated number in strictly stuck group are assigned to one of the sub-groups.

7. The packet scheduling method according to claim 1, wherein at step 3-3, an order of the grant spaces in non-strictly stuck group is the same as an order of the termination frame indices of the grant spaces in non-strictly stuck group, if the termination frame indices of the grant spaces in the non-strictly stuck group are identical, sorting the grant spaces in the non-strictly stuck group with the identical termination frame indices according to the start frame indices thereof.

8. The packet scheduling method according to claim 1, wherein at step 3-5, checking whether the frames corresponding the frame indices to which the data bursts of the grant spaces in strictly stuck group are shifted are able to contain at least one data burst, if the frames corresponding the frame indices to which the data bursts of the grant spaces in strictly stuck group are shifted are able to contain at least one data burst, shifting the data bursts in the frame corresponding to the stuck frame index of grant spaces in the non-strictly stuck group to the frames corresponding the frame indices to which the data bursts of the grant spaces in strictly stuck group are shifted and are able to contain at least one data burst.

9. A communication apparatus, comprising:
a memory, recording program codes of a packet scheduling method, and the packet scheduling method is used to aggregate unscheduled data bursts of grant spaces in a grant space set into frames, wherein each grant space comprises a start frame index, a termination frame index, and a data frame index;
a wireless transmitting/receiving unit; and
a computing unit, connected to the memory and the wireless transmitting/receiving unit, used to execute the program codes, so as to control the wireless transmitting/receiving unit to execute at least the following steps:
step 1, finding a minimum of the termination frame indices of the grant spaces in the grant space set as a stuck frame index;
step 2, finding a stuck group according to the start frame indices of the grant spaces in the grant space set and the stuck frame index, and shifting the data bursts of the stuck group to a frame corresponding to the stuck frame index; and
step 3, shifting the data bursts of the grant spaces of the stuck group in the frame corresponding to the stuck frame index;
wherein step 3 comprises:
step 3-1, dividing the grant spaces in the stuck group into a strictly stuck group and a non-strictly stuck group according to the termination frame indices of the grant spaces in the stuck group and the stuck frame index;
step 3-2, sorting the grant spaces in the strictly stuck group according to the start frame indices of the grant spaces in the strictly stuck group, and dividing the sorted grant spaces in the strictly stuck group into several sub-groups according to a data burst accommodated number of the frame and a number of the grant spaces in the strictly stuck group, wherein the sub-groups comprises a first through $N^{th}$ sub-groups, and N is a number of the sub-groups;
step 3-3, sorting the grant spaces in the non-strictly stuck group according to the termination frame indices and the start frame indices of the grant spaces in the non-strictly stuck group;
step 3-4, for i is equal to 1 through N, shifting the data bursts in the frame corresponding to the stuck frame index of the grant spaces in the $i^{th}$ sub-groups according to values of i and N; and
step 3-5, shifting the data bursts in the frame corresponding to the stuck frame index of the grant spaces of the non-strictly stuck group according to frame indices of the frames to which the data bursts are shifted in the grant spaces of the strictly stuck group;
wherein at step 3-4, shifting the data bursts in the frame corresponding to the stuck frame index of the grant spaces in the $i^{th}$ sub-group to the frame corresponding to the frame index being equal to the stuck frame index minus N−i, if the data burst is unable to be shifted to the frame corresponding to the frame index being equal to the stuck frame index minus N−i, shifting the data burst to the frame corresponding the frame index which the data burst is unable to be shifted forward anymore.

10. The communication apparatus according to claim 9, wherein the computing unit further controls the wireless transmitting/receiving unit to execute the following step:
step 4, aggregating the data bursts in the grant spaces of the stuck group to the frames corresponding to frame indices to which the data bursts are shifted.

11. The communication apparatus according to claim 9, wherein the computing unit further controls the wireless transmitting/receiving unit to execute the following steps:
step 5, removing the grant spaces of the stuck group from the grant space set;
step 6, determining whether the grant space set is a null set, if the grant space set is the null set, ending the packet scheduling method, and if the grant space set is not the null set, continuing to execute step 1 through step 3.

12. The communication apparatus according to claim 9, wherein at step 2, finding the grant spaces in the grant space set with the start frame indices being less than or equal to the stuck frame index as the grant spaces of the stuck group.

13. The communication apparatus according to claim 9, wherein at step 3-1, finding the grant spaces of the stuck group with the termination frame indices being equal to the stuck frame index as the grant spaces of the strictly stuck group, and finding the grant spaces of the stuck group with the termination frame indices not being equal to the stuck frame index as the grant spaces of the non-strictly stuck group.

14. The communication apparatus according to claim 9, wherein at step 3-2, an order of the grant spaces in the strictly stuck group is the same as an order of the start frame indices of the grant spaces in the strictly stuck group, and the value of N is a ceiling integer of a number of the grant spaces in the strictly stuck group divided by the data burst accommodated number, and the sorted grant spaces of every data burst accommodated number in strictly stuck group are assigned to one of the sub-groups.

15. The communication apparatus according to claim 9, wherein at step 3-3, an order of the grant spaces in non-strictly stuck group is the same as an order of the termination frame indices of the grant spaces in non-strictly stuck group, if the termination frame indices of the grant spaces in the non-strictly stuck group are identical, sorting the grant spaces in the non-strictly stuck group with the identical termination frame indices according to the start frame indices thereof.

16. The communication apparatus according to claim 9, wherein at step 3-5, checking whether the frames corresponding the frame indices to which the data bursts of the grant spaces in strictly stuck group are shifted are able to contain at least one data burst, if the frames corresponding the frame indices to which the data bursts of the grant spaces in strictly stuck group are shifted are able to contain at least one data burst, shifting the data bursts in the frame corresponding to the stuck frame index of grant spaces in the non-strictly stuck group to the frames corresponding the frame indices to which the data bursts of the grant spaces in strictly stuck group are shifted and are able to contain at least one data burst.

* * * * *